United States Patent [19]

Willoughby

[11] Patent Number: 4,767,804

[45] Date of Patent: Aug. 30, 1988

[54] CONTROL OF TRANSFORMATIONS WITHIN POLYMERS AND PRODUCTS THEREOF

[75] Inventor: Bryan G. Willoughby, Telford, England

[73] Assignee: Rubber Bands and Plastic Research Association of Great Britain, Great Britain

[21] Appl. No.: 903,838

[22] Filed: Sep. 4, 1986

Related U.S. Application Data

[63] Continuation of Ser. No. 635,514, Jul. 30, 1984, abandoned.

[30] Foreign Application Priority Data

Aug. 3, 1983 [GB] United Kingdom ................ 8320904

[51] Int. Cl.$^4$ ............................ C08J 3/22; C08J 5/06; C08K 9/04
[52] U.S. Cl. .................................... 523/351; 523/200; 525/107; 525/360; 525/362; 525/363; 525/364; 525/365; 525/366; 525/367; 525/368; 525/369; 525/370; 525/371; 525/372; 525/373
[58] Field of Search ............... 525/370, 360, 363, 365, 525/366, 367, 368, 369, 371, 372, 373, 107, 362, 364; 523/351, 200

[56] References Cited

U.S. PATENT DOCUMENTS

| | | | |
|---|---|---|---|
| 3,026,281 | 3/1962 | Harren et al. | 525/370 |
| 3,779,952 | 12/1973 | Leonard, Jr. | 525/370 |
| 3,781,315 | 12/1973 | Pepe et al. | 556/81 |
| 3,923,726 | 12/1975 | Benz | 523/351 |
| 3,925,511 | 12/1975 | Loveless | 525/360 |
| 3,927,053 | 12/1975 | Gallagher et al. | 528/55 |
| 4,005,247 | 1/1977 | Graham | 525/370 |
| 4,080,490 | 3/1978 | Dawans et al. | 525/370 |
| 4,087,598 | 5/1978 | Wichterle et al. | 525/370 |
| 4,187,361 | 2/1980 | Banucci et al. | 525/360 |
| 4,334,043 | 6/1982 | Groepper | 525/370 |
| 4,361,497 | 11/1982 | Boldt et al. | 525/370 |
| 4,362,837 | 12/1982 | Teyssie | 524/400 |
| 4,380,599 | 4/1983 | Tooke-Kirby et al. | 525/370 |
| 4,419,482 | 12/1983 | Teyssie | 524/560 |
| 4,443,586 | 4/1984 | Starnes, Jr. | 525/370 |
| 4,544,760 | 10/1985 | Keogh | 525/370 |

FOREIGN PATENT DOCUMENTS

| | | | |
|---|---|---|---|
| 1226782 | 10/1966 | Fed. Rep. of Germany | 523/351 |
| 51-28840 | 3/1976 | Japan | 523/351 |
| 51-30851 | 3/1976 | Japan | 523/351 |
| 1604225 | 12/1981 | United Kingdom . | |

*Primary Examiner*—Allan M. Lieberman
*Attorney, Agent, or Firm*—William E. Mouzavires

[57] ABSTRACT

The invention provides a polymer derivative comprising the reaction product of a metal compound and a polymer having functional groups. The metal compound may be an acetate, carbonate, chloride, hydroxide, oxalate, oxide or sulphate of Al, Ba, Ca, Ce, Cd, Co, Cr, Cu, Fe, Hg, K, Li, Mg, Mn, Mo, Na, Pb, Sn, Ti, V, Zn and Zr. The functional group may be a carboxylic acid group, a thiol group or an olefinic group.

The invention includes a process for efficiently reacting a functional group on a polymer with at least one co-reagent wherein the co-reagents are rendered compatible with the polymer, for example by being dissolved in the polymer or in a solution thereof whereby the reaction is effected in a single phase. The process may be a two stage process which comprises forming a metal derivative of a polymer of relatively low molecular weight and then incorporating the metal derivative into a polymer of higher molecular weight.

20 Claims, 3 Drawing Sheets

CONTROL OF TRANSFORMATIONS WITHIN POLYMERS AND PRODUCTS THEREOF

This application is a continuation of application Ser. No. 06/635,514, filed July 30, 1984, now abandoned.

DESCRIPTION

This invention relates to the controlled availability of active species within polymers and with the means for achieving and exploiting this control. In particular it is concerned with the facile incorporation into reactive polymer systems of metal ions to the benefit of subsequent processing and the final products obtained.

A significant feature of this invention is the means by which established polymer processing technologies may be improved or exploited to give improved or novel products. The invention is broad in scope but can be illustrated initially in terms of its application to processing. For example if the processing of the polymer involves a curing reaction then it is recognised that the nature of added catalysts is crucial to successful curing.

For any curing reaction a variety of catalysts may be available but since an individual catalyst may be very specific in its function the choice of the most appropriate catalyst is not obvious and may only be determined after appropriate and often laborious trials. Catalysts may be so specific in their action that slight and often unrecognised changes in their composition may significantly change catalytic efficiency and thus the user can be faced not only with problems of selection but with problems of obtaining reproducibility with the chosen catalyst system.

This high specificity may carry disadvantages in other ways since it may actually serve to restrict compound development. Thus the effort of selection and specification of the preferred catalyst for a given system may prove valueless if the resin formulation is subsequently modified. Furthermore, given the availability of an effective catalyst, problems may still be encountered if the scale of operation requires a suitably long work life and thus a delay in the onset of cure after mixing the ingredients.

Examples of such specificity of catalysis can be seen in the cures of epoxy compounds. For these systems metal compounds are amongst the preferred catalysts. Chromium (III) compounds can be most effective catalysts for the carboxylic acid/epoxide reaction; for example chromium octoate has been successfully used. However, this metal soap shows high specificity being most effective in relatively non-polar mixes, such as epoxy cures of acid-terminated polymers which have hydrocarbon backbones. Furthermore the commercial products are not always clearly defined and samples of chromium octoate from different sources can show different catalytic behaviour.

The problem is not only limited to chromium (III) soaps. Chelates of chromium may show similar specificity and product variability. For example samples of nominally the same chromium (III) chelate of diisopropylsalicylic acid, but prepared by different routes, can differ widely in catalytic ability. Furthermore such a chelate may be a dusty powder which may be difficult to contain effectively in normal handling.

Examples of the control of work life may be seen in the cure of unsaturated linear polyesters. Such polymers are commonly liquids or low-melting solids which can be cured by reaction of the polymeric backbone unsaturation in a manner analogous to conventional vinyl copolymerisations. The co-monomer is usually styrene and a room temperature cure can be obtained if appropriate initiators are included. In this case a so-called "redox" initiating system, comprising a hydroperoxide and a metal salt, provides the necessary activity at ambient temperatures. The metal salt must be capable of reducing the hydroperoxide and must be soluble in the resin mix. To achieve the required solubility such salts are commonly naphthenates or octoates and cobalt is a preferred metal. Whereas these requirements for materials' selection are widely known there is a major disadvantage of room-temperature curing systems; namely that the resin mix, once fully formulated, will start to cure even on storage prior to fabrication. Thus there is a conflict between the needs and adequately long "pot life" for storage of the mix and for a usefully short cure time once fabrication has been completed.

But problems of control are limited not only to curing formulations. Metal compound additives (e.g. catalysts or stabilisers) for polymers may be toxic and yet commonly available as dusty or flaky powders. In consequence containment of the hazard when handling such powders may pose serious problems.

Thus it is evident that the needs for control in polymer processing apply not only to chemical reactions within the processing polymers but also to additives and the manner by which these can be handled. Furthermore it will be seen that the solutions to these problems are wide-ranging and provide opportunities for exploitation in areas other than those specified above.

One object of the present invention is to control the availability of active species within polymers; and consequently provide enhanced control of reactions on polymers. It will be seen that this can be achieved, in the first instance, by making such species compatible with (i.e. dissolved in) the polymer, or blend or solution thereof, when it is required so to do. But the primary need is to achieve this by methods which are convenient and generally applicable, such that practical procedures may be applicable amongst a range of polymer types without extensive reformulation.

According to the present invention a process for efficiently reacting a functional group on a polymer requires that the necessary co-reagents are deliberately rendered compatible with that polymer. Where reagents are essentially incompatible a solvent is required to accomplish reaction: by this means metallic ions may be rapidly incorporated with a polymer. Such treatment transfers reagents into the polymer matrix, thereby enabling them to participate more effectively in further reactions within that matrix. Where more than one of the interacting groups are bound to polymer molecules, then the supporting polymers should be mutually compatible if an effective solvent-free interaction is required.

In this invention compatibility is seen to be crucial for progressing homogeneous (i.e. single phase) reactions, and the character and molecular weights of reacting polymers must be selected to facilitate the required solubility.

In this invention metallic ions may be incorporated into polymers of any molecular weight by firstly incorporating the metal into a polymer of low molecular weight. (No. average molecular weight typically less that 20,000 when measured in terms of polystyrene equivalents), this stage usually being carried out as a solution reaction. Unwanted by products are removed after this first stage, and the metal-containing polymers can be obtained in an easily handled mobile or thermoplastic form.

In the second stage of this invention this first product is incorporated into a higher molecular weight polymer, to the benefit of processing operations or product properties. Processing advantages can be obtained when the first product is allowed to form itself into a higher molecular weight polymer, e.g. by agglomeration or crosslinking, or when the first product is blended with suitable polymeric precursors so that this product can catalyse the formation of the higher molecular weight polymer. In this latter context this first product may or may not become chemically bound into this higher molecular weight polymer. This second stage may be accomplished by blending, casting, coating, curing or by any combination of these. Heat may or may not be used. Where solvent are initially present, or introduced to assist or control blending, their removal from the final product can be by evaporation or by derivatising such a solvent so that it becomes incorporated into the molecular structure of the final product.

No restriction on the type of metal to be incorporated is implied: this invention being applicable to any metal which may be incorporated by the methods described; these being monovalent, divalent or polyvalent, of high or low atomic weight. The method for incorporating metallic ions into the polymer involves treating the polymer with a metal compound preferably in the presence of a solvent. Suitable solvents depend on the reagents concerned but most commonly include hydrogen-bonding types such as those containing hydroxyl groups (notably alcoholic groups, carboxylic acid groups). Usually, the removal of this solvent precedes subsequent processing stages.

The type of metal to be incorporated depends on this subsequent processing or end use of the final product. For example metallic ions may be incorporated into a polymer to control the speed of subsequent processing if that processing involves a curing reaction subject to homogeneous catalysis, i.e. where the catalyst is in the same phase as the reactants, (or co-catalysis) by metal ions. In this case the metal ion chosen will be chosen for its ability to catalyse or co-catalyse the intended cure.

Curing reactions amenable to metal ion catalysis, co-catalysis or other advantageous participation include epoxy/hydroxyl (for acidic hydroxyl), epoxy/anhydride, isocyanate/hydroxyl, thiol oxidation, silanol/alkoxysilane and the hydroperoxide crosslihking of unsaturated polymers.

The range of possible metals includes any one of the types already used in these systems. There are at least 20, but the preferred choice of metal type and oxidation state will depend on the reaction to be catalysed.

For example in condensation esterifications or in ester-forming epoxy cures catalysts include compounds of: Al, Ca, Cd, Co, Cr, Fe, K, Li, Mg, Mn, Na, Pb, Sn, Ti and Zn. In isocyanate/hydroxyl additions the list of available catalysts includes compounds of: Co, Cu, Cr, Fe, Hg, Na, Pb, Sn, Ti, V and Zn. Thiol oxidations may be catalysed or effected by compounds including those of: Ce, Co, Cr, Cu, Mn, Mo, Pb and V. Silanol/alkoxysilane reactions may be catalysed by compounds of Al, Cd, Fe, Mn, Pb, Sn, Ti or Zr. Hydroperoxide decomposition may be catalysed by a variety of species including compounds of: Ca, Ce, Co, Fe, Mn, Pb, V, Zn and Zr.

In the application of this invention, a polymer bearing suitable functional groups for conversion to a catalytic metal derivative may be first derivatised in this manner and then added to a compatible polymer but bearing suitable functional groups for participation in a curing reaction when catalysed in the expected manner. Thus a polymer bearing carboxylic acid groups may be fully neutralised to a metal carboxylate and this metal derivative then added to a compatible polymer bearing hydroxyl (alcoholic) groups which can be subsequently cured by reaction with a diisocyanate.

A preferred form of the application of this invention to catalysis comprises reacting a metal compound with a reactive polymer and then reacting this same polymer further with a curing agent. In one approach the same functional group on the polymer can be used for derivatisation to the metal compound and also in the subsequent cure. In this case an excess of the reactive polymer is first reacted with the metal compound and the residual reactive polymer is then reacted with a curing agent. For example the reactive polymer may contain carboxylic acid groups (for partial conversion to a metal carboxylate) and may be cured by the reaction of these groups with a di- or polyfunctional epoxide. Alternatively the reactive polymer may contain thiol groups (for partial conversion to a metal mercaptide) which may be subsequently oxidised to effect a cure. In another approach to this preferred form different types of functional groups can be exploited for derivatisation and for subsequent cure. Examples of this would include polymers bearing: carboxylic acid and olefinic groups (for catalysed hydroperoxide cure), carboxylic acid and hydroxyl (alcoholic) groups (for isocyanate cure), and olefinic and hydroxyl (alcoholic) groups (for isocyanate cure).

Where the catalyst is a metal derivative of a reactive polymer, it need not be isolated during the process. The invention includes the metal derivative catalyst of a reactive polymer, for example of an acidic polymer. The invention further includes a process for making such a catalyst which comprises treating the reactive polymer with a metal compound preferably in the presence of a solvent for the catalyst-forming reaction, and removing unwanted by-products in a phase separation (e.g. distillation or precipitation) stage.

By chemically binding the catalyst metal into the same polymer type as that to be cured by the metal catalysed reaction, controlled and predictable compatibility is achieved. By using these procedures curing times or temperatures may be reduced significantly below those in current practice. Better control of the cure can also lead to higher performance products.

Such is the control of catalyst availability that can be achieved by this invention that catalysed cures can be accomplished even when the reactive polymer and polymeric catalyst are initially separated in different phases. In such instances the reactive polymer and polymeric catalyst might be blended with one component dispersed in suspension in another (non- or poorly solvating) material. Alternatively, one of the polymeric components (e.g. the catalyst) may be present in an agglomerated (and recognisably solid) phase, or as a coating on another material. By attention to the component of the cure mix, or to the sequence of operations, this controlled availability of catalyst can be used to enhance storage stability ('pot life') or introduce a delay into the process of cure.

Such is the control of catalyst compatibility which is accessible by the use of polymeric co-reagents that a catalysed cure may be accomplished, and contained, within one phase of a permanently heterogeneous mix. Indeed two nominally independent cures can be made to occur simultaneously within a single but heterophase mix. Such blended systems offer both process and product advantages. For example, filled rubbers can be produced using liquid curing technology without the need to handle excessively stiff or abrasive precured mixes. Thus wider range of blends can exploit the benefits of liquid curing technologies and a wider range of products can be obtained.

However, this invention is applicable also to processing technologies and products outside those listed above. By incorporating metals into polymers by the methods described a wide range of benefits may be obtained. For example metal ions may be incorporated to facilitate blending in processing, or to facilitate adhesion to substrates in fillers. Moreover, by incorporating metal ions into polymers which may be converted into higher molecular weight products as a separate processing stage, ion-containing polymers in a variety of shapes and forms are conveniently obtained. Thus the novel properties (e.g. rheological, permeable, electrical) may be exploited in conveniently fabricated products. Furthermore when the metal ion type is a stabiliser, products with enhanced resistance to degradation can be obtained. For example recognised stabilisers for poly(-vinyl chloride) include compounds of: Ba, Ca, Cd, Pb, Sn and Zn. Thus this invention includes a means for obtaining ion containing polymers via the conversion or processing of an easily handled polymer, namely a metal ion containing product derived from a low-molecular weight polymer.

This invention is concerned with the control of reactions on polymers and the means by which the reagents involved may be used most effectively. Thus it is concerned with both the enhancement of reactions and the means by which such reactions may be suppressed. The invention is applicable to processes of synthesis, ion-exchange, derivativisation, curing and the promotion of—or protection from—degradation.

This invention is concerned with the convenient production of polymers containing metallic ions and the process and product benefits arising. Thus it is applicable to technologies requiring dispersant or mobility control, wetting, adhesive or surfactant properties or the production films, membranes, coatings or of products requiring specific density, optical or electrical characteristics.

This invention is applicable to a wide range of established technologies which employ liquid or low-molecular weight polymers. Thus it is applicable to plasticisation and to the production of coatings, sealants, laminates, adhesives, binders and also in the manufacture of cast or moulded products. Furthermore, this invention enhances control of curing processes so that such curing processes can now be applied to other product areas. Thus it facilitates the production of blends and is applicable to the manufacture of modified polymers and multi-phase products.

Thus it will be apparent that the products of this invention may range in character from hard plastic materials to soft rubbers, may be thick in section or thin, and may be solid, foamed or microporous. The products included may be transparent or opaque or may be composite structures involving fillers or bound agents, or coated fibres, wire or sheet.

The development of the invention may be illustrated with respect to catalysis. Compatibility is the key to the successful exploitation of a homogeneous catalyst (a catalyst capable of effecting homogeneous catalysis), but when the reagents include polymers, compatibility may become difficult to achieve. With coloured catalysts, such as those based on chromium, failure to dissolve the catalyst can be easily recognised visually and such poor solution is a characteristic feature of those mixes where established chromium catalysts perform inadequately. Thus homogeneous catalysts which have limited solubility in polymeric systems will have limited applicability to the curing reactions of these polymers.

Whilst seeking higher and more reproducible compatibility of homogeneous catalysts in polymeric systems it became apparent that such compatibility could only be consistently achieved if the metal catalyst was chemically bound to a polymer of the same type and approximate molecular size as that of the polymer to be reacted in the cure. This requirement is a consequence of that required for miscibility among polymers. The concept may be extended to aggregated ('gelled') systems if the ion-cluster network can be broken by solvent action. In this case the solvent could be additional polymer of the same type as that supporting the metal, and of approximately the same molecular size as the polymeric species released from the network. Furthermore, the recognition of the relationship between the polymer-supported reagent (e.g. catalyst) and the polymer for reaction (e.g. resin for cure) is fundamental to the making of this invention.

However, the recognition of such a relationship is only one aspect of the invention; at least as important is how such polymeric catalysts may be prepared conveniently. Previously attempts to make such polymer-bound catalysts have involved the dry-blending of components which are essentially incompatible; operations which are energy-intensive and require prolonged periods at temperatures in excess of 150° C. Even then the inefficiency of such treatments is reflected in the limited choice of metal types for incorporation in the catalysts and the limited conversions of the products. Thus the products, although catalysts, do not match the catalytic powers of the better low molecular weight catalysts. But the processes of this invention are widely applicable enabling the preferred metal types to be incorporated into the chosen polymer.

In this invention metallic ions may be incorporated into a liquid polymer by a process which rapidly renders the co-reagents compatible; namely by utilising where needed a solvent. The solvent should be a good solvent for the chosen ionic displacement reaction and a solvent for the reacting polymer.

This invention will now be further illustrated in the following examples, the significance of which will first be discussed.

Reference will also be made in certain of the Examples to the accompanying drawings in which.

Example 1 shows how chromium ions may be incorporated into a polymer to benefit a subsequent epoxy cure. In this case the raw materials for the first stage are a carboxyl-terminated liquid acrylonitrile-butadiene copolymer ('nitrile rubber') and chromic acetate, both reagents being present in solution. The polymer was dissolved in ethoxyethanol and the solution placed in a distillation flask from which the solvent was slowly distilled. The chromic acetate was first dissolved in the minimum of glacial acetic acid and the resulting solution diluted with ethoxyethanol. When this second solution was added slowly to the distilling solution of the polymer a clear green polymer-containing solution was obtained. A feature of this preparation is the use of a solvent (ethoxyethanol) which has a boiling point (133°-136° C.) high enough to ensure that acetic acid, either from the co-solvent or from a displacement reaction, is removed from the product solution during solvent distillation.

That chromium-containing species remain in the polymer and are not lost by distillation can be inferred from the absence of any colouration in the distillate and from ultra-violet spectroscopic analysis of the polymeric product. Such spectroscopic analysis suggests that the chromium is bound to carboxylates (as in other salts of carboxylic acids) and provides quantitative evidence that all the chromium introduced into the reaction has been retained in the product polymer.

That chromium ions are bound to the product polymer can be inferred from both qualitative and quantitative observations. For example when a solution of the liquid 'nitrile rubber' (10% w/v in toluene) and containing chromium octoate, in molar amounts equivalent to the mix described in the above example, is treated with a slight volume excess of methanol, then the polymer is reprecipitated from solution and the green colour of chromium is evident in both the precipitated polymer and the supernatant liquid but is darker in the non-polymer layer. However if this experiment is repeated with the polymeric product of Example 1 then the characteristic green colour resides only in the precipitated polymer layer. Quantitative measurements of molecular weight also provide evidence for the chemical binding of chromium into the product as obtained in Example 1. This can be seen by comparing the weight-average molecular weights ($M_w$ as polystyrene equivalents) before and after treatment with chromic acetate in the above manner. The results obtained were as follows:

carboxyl-terminated 'nitrile rubber', $M_w = 14,000$ polymeric product of the above reaction, $M_w = 19,500$ It should perhaps be noted that a simple solution of a chromium salt, such as chromium (III) octoate in a carboxyl-terminated nitrile rubber will produce some increase in $M_w$ of the polymer component when the mix is allowed to equilibrate. However, the effect is not so marked as for the chromic acetate reaction product [e.g. $M_w = 17,500$ for chromium (III) octoate at the same chromium concentration as in the chromic acetate product described above].

In a duplicate preparation (Example 2) evidence for reaction was obtained from the equivalent weight of the final product, this changing from 1610 (for the initial polymer) to 2200 for the final product. For the system studied this corresponded to a loss of 37 meq of acid, i.e. 97% yield.

The chromium-containing product of this reaction will catalyse the cure of the residual acid-containing polymer when this is blended with an epoxy resin. The epoxy resin can be of any compatible type, e.g. glycidyl ether, glycidylamine or cycloaliphatic. By this means cured rubbery products may be obtained as mouldings, encapsulants or as coatings on other substrates, if a solvent had been present initially to assist film-forming.

Processes for the rapid incorporation of metal ions into a polymer are not restricted to those working entirely from solutions. For example the incorporation of chromium ions into a carboxyl-terminated liquid nitrile rubber can be accomplished in a reaction mix which has only the polymer initially in solution. Example 3 shows how this can be achieved: the polymer is dissolved in iso-propanol and the chromic acetate is added, as a powder, to this solution. In this case dissolution of the chromic acetate is achieved after a short period (e.g. 1-2 hr.) of reflux. Evidence for the involvement of the acid-containing polymer in the dissolution of this chromic acetate is apparent from such rapid dissolution: for example the chromic acetate used could not be dissolved in iso-propanol alone, even after heating under reflux for 16 hr. In the reaction described iso-propanol can be distilled from the mix to give a clear dark green product from which no solid separates out. However, with due regard to distillation temperatures such a homogeneous product can be obtained with apparently little acetic acid released. This product will catalyse the curing reactions with epoxy resins as has already been described. However, a preferred form of this catalyst is that prepared under conditions which set out to displace and remove the by product acetic acid.

In Example 3 the initially formed product was subjected to a further period of heating under vacuum at 100° C. or above until acetic acid ceased to be evolved. This change is accompanied by no change in the colour of the product but an increase in viscosity, is observed (higher chromium ion concentrations can cause gelation). These are the expected characteristics of a polymer-bound chromium salt.

The benefits gained from the removal of monofunctional acids (e.g. acetic) or their residues from this product can be seen with regard to the properties obtained. Such monofunctional acids function as chain terminators in curing reactions involving acidic groups, to the detriment of the resulting products. In Example 3 the cure of the epoxide carboxyl-terminated nitrile rubber when catalysed by the product of its reaction of chromic acetate is compared with the same cure mix when catalysed by chromium octoate—in both cases using chromium concentrations of around 10 mole %. The product obtained using the chromium derivative of the polymer possesses a higher tensile strength and lower elongation at break than that obtained using chromium octoate.

Thus it will be apparent that this invention is not only concerned with improvements to processing, e.g. to curing, but also with a material, namely the metallic derivative of the polymer.

When used as a catalyst such a polymer supported metal compound should be prepared in a manner which is substantially free of low-molecular weight by-products. This not only applies to the removal of monofunctional acid components which can function as chain-terminators in an epoxy cure, but also to such byproducts which could themselves retard subsequent cures. For example acidic components are known retarders to both isocyanate/hydroxyl (alcoholic) reactions or thiol oxidations.

In Examples 4 and 5 catalysts for such cures are prepared, by displacement reactions of acetates, and the removal of acid byproducts was effected by reprecipitation. In the case of Example 4, as with Examples 1–3, the catalyst was prepared by partial derivatisation of the original polymer in such a manner as to leave residual functional groups available for reaction in the subsequent cure.

In Example 4 the starting polymer was a commercial liquid polysulphide which is functional in thiol groups, and the catalytic moiety was copper (II) mercaptide obtained by the reaction of some of these thiol groups with cupric acetate. Such a product in a formulation containing only 0.015% w/w of Cu (II) in polysulphide was able to catalyse the air oxidation of a thin film in 5–6 hours' standing at ambient temperature. Such a formulation provides the basis of so-called 'one component' mixes which are capable of curing, on exposure to air, without further addition of reagents being necessary. The convenience of such operations offers a substantial benefit to operations which apply sealants to substrates, notably in the construction industries where simplicity in operations is often desirable.

Figure 1:
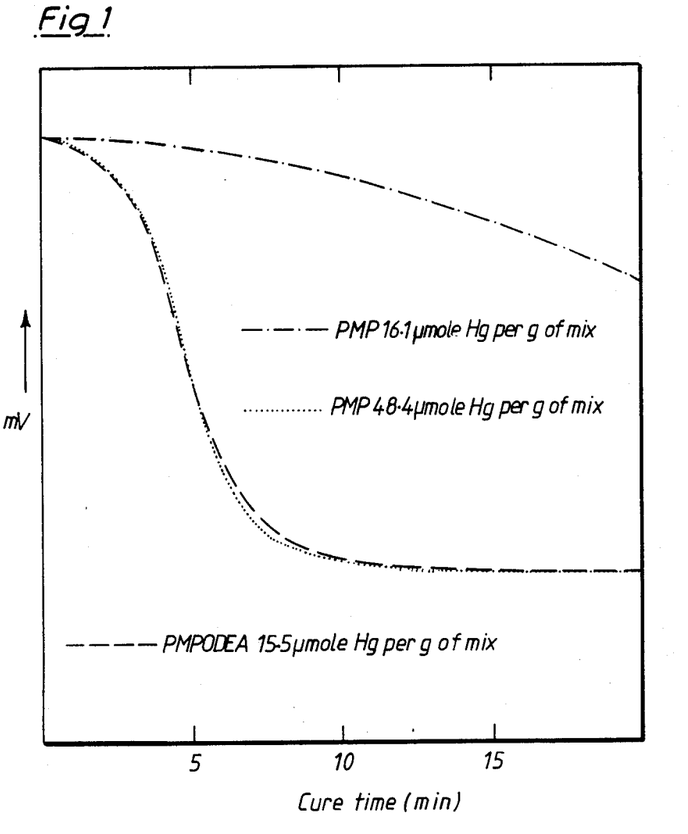
FIG. 1 is a graph showing the traces obtained using a vibrating needle curemeter (as hereinafter defined) for cures of poly (oxidiethylene adipate) diol ('Diorez 520') with polymeric MDI ('Desmodur VL'), catalysed by either the phenylmercury carboxylate of succinic anhydride half ester of the above diol (PMPODEA) or phenylmercury propionate (PMP)

In Example 5 a poly(oxydiethylene adipate) bearing carboxylic acid functional groups is first obtained from a commercially available polyol and subsequently derivatised by neutralisation with phenylmercury acetate. The product obtained was reprecipated from acetone solution by addition of water to give, after removal of solvents, a polymer containing (by elemental anaysis) 9.3% Hg. This first product is then added to more of a commercial poly(oxydiethylene adipate) glycol to catalyse the room temperature cure with a diisocyanate. The performance of this catalyst, compared with that of a conventional low molecular weight organomercury catalyst, is shown in FIG. 1; where the respective traces are those obtained on a research instrument designed specifically for monitoring curing liquid formulations [Rubber World, 1982, 187(3), 26]. In this instrument—termed a 'vibrating needle curemeter'—the progress of the cure is monitored by the resistance to movement of a vibrating needle which dips into the curing mix. The changes are monitored electrically, the progress of cure being characterised by a decreasing voltage (see FIG. 1). From the figure it will be seen that the mercury-containing derivative of poly(oxidiethylene adipate) is a more effective catalyst for an MDI (polymeric) cure of poly(oxidiethylene adipate) glycol than is phenylmercury propionate (a commercial organomercury polyurethane catalyst) at equivalent molar concentrations of mercury.

Where toxic metal derivatives are concerned there is a benefit in addition to catalyst activity. Some of the conventional organomercury catalysts, such as phenylmercury propionate, are powders and potentially the source of dust hazards when handled. Polymer-supported organomercury catalysts have essentially the physical characteristics of the supporting polymer and characteristically would not be friable or dusty. For the mercury-containing initial product of Example 5 the material was a liquid of similar viscosity to the original polymer.

Additionally by using a polymer-supported metal catalyst toxic hazards may be contained not only in processing but also in the final product. This can be achieved using the principles outlined earlier where the moieties are bound to a polymer which retains sufficient functionality to enable the catalyst-supporting polymer to be itself chain-extended and thus minimise the possibility of migration from the product. Thus the catalyst containing species become an integral part of the product, an effect most advantageously exploited in network-forming systems. In the case of polyurethane cures even nominally difunctional reagents are capable of network formation if the isocyanate is in excess so that crosslinking side reactions occur.

Examples 6 and 7 illustrate two further approaches to the functionalisation of polymers with organomercury moieties so that hydroxyl terminals remain for subsequent participation in the cure.

Figure 2:
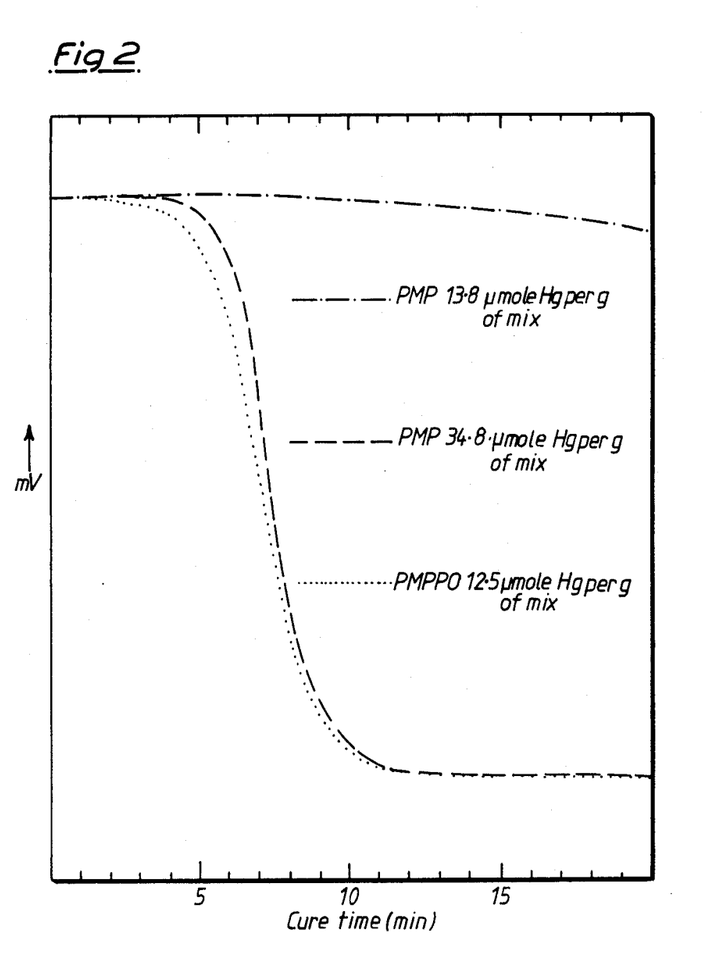
FIG. 2 is a graph showing vibrating needle curemeter traces for cures of poly (propylene oxide) diol ('Propylan D2122') with polymeric MDI ('Desmodur VL'), catalysed by either the phenylmercury carboxylate of a partial half ester from poly(propylene oxide), triol and succinic anhydride (PMPPO) or phenylmercury propionate (PMP)

In Example 6 a conventional polyether triol was first partially derivatised to an acid-functional polymer (in this case by succinnic anhydride addition to some of the available alcoholic hydroxyl groups). These acid groups were then neutralised with organomercury moieties, in this case by reaction with phenylmercury hydroxide. The use of this coreagent enables somewhat lower reaction temperatures to be used than might be practical with phenylmercury acetate, and thus a polyether backbone even as reactive as poly(propylene oxide) can be protected from unwanted free radical side reactions (which might otherwise be expected at elevated temperatures in the presence of organometallic species). The reaction of a carboxylic acid with a hydroxide in this manner is characterised by the creation of metal carboxylate bonds, a process which may be conveniently monitored by infra-red spectroscopy. Thus the intermediate catalyst polymer is characterised by infra-red absorptions at 1580 and 1660 cm$^{-1}$ not present in the spectrum of the parent polymer or reagent mix. The effectiveness of this organomercury polymer in catalysing polyurethane forming reactions is shown in FIG. 2. In this case the initially-formed organomercury product was added to further underivatised poly(propylene oxide) to achieve appropriate dilution of the catalytic moieties. The selectivity of catalysis is also illustrated with reference to this initially formed organomercury product; this product being also a catalyst for an isocyanate cure of a polybutadiene 'diol' but less effective than an organomercury derivative of a low molecular weight polybutadiene (Example 6).

In Example 7 the chemistry of formation of the organomercury polymer was different in that the mercury-carbon bond was created during derivatisation of the polymer. By this means preliminary functionalisation becomes unnecessary and commercially-available polyurethane precursor polymers may be converted directly to a catalytic derivative. The reaction exploited is the addition of mercury (II) acteate to olefins and it is appropriate to note that commercial polyether polyols may contain some backbone unsaturation especially in the case of the higher molecular-weight materials. In the case of Example 7 the polymer selected for derivatisation was a commercially available hydroxyl-terminated liquid polybutadiene. The initial product after heating with mercuric acetate in refluxing isopropanol/dichloromethane, and removing the solvent, was a clear yellow viscous liquid having an infra-red absorption at 430 cm$^{-1}$ characteristic of organomercury. This product is an effective catalyst in the isocyanate cure of hydroxyl-terminated polybutadiene.

In the examples listed so far the processes of the invention have been used to provide a method of curing liquid formulations to make recognisably elastomeric products. However these procedures are widely applicable and can be used to make non-rubbery products. For example acrylic/epoxy and alkyd/epoxy stoving enamels can be effectively catalysed by the metal [e.g. chromium (III)] carboxylate of the initial acid-functional polymer. Such procedures are particularly valuable because the cures of more polymers such as these are often not readily catalysed by conventional catalysts such as chromium octoate. Substantial reductions in commonly-used stoving temperatures can be effected when using the appropriate polymer-supported catalysts in this way.

Furthermore the processes of this invention are not confined only to catalysed step-growth curing processes. Benefits may also be obtained with regard to free radical crosslinking cures and Examples 8 and 9 illustrate how this may be achieved with regard to an air drying paint and an unsaturated polyester. In both these examples metal ions are introduced to catalyse the formation of radical species. In both cases the parent polymers were polyesters containing residual carboxylic acid groups and cobalt (II) ions were incorporated by the reaction of some of these groups with cobaltous acetate. In Example 8 the starting polymer was an air drying alkyd resin which, after incorporation of cobalt (II), could be cast from solution into a film capable of undergoing a cure by catalysed autooxidation. In Example 9 the starting polymer was a poly(oxydiethylene maleate) which, after incorporation of cobalt (II), could be blended with styrene to form a free-flowing liquid capable of being cured by the catalysed decomposition of an added source of free radicals (hydroperoxide). Thus catalytic polymers such as these have value in both surface coatings and composites.

However the benefits of using a catalytic polymer are not just confined to high activity, this invention also provides the means by which this activity may be controlled. Example 9 shows how this may be carried out with respect to an unsaturated polyester cure where the initial cobalt-containing product can be isolated as an agglomerated (i.e. effectively 'gelled') and tack-free material. Such a product is soluble in common solvents and can be cast as a tack-free coating on glass fibre. When more of the same resin, but containing styrene and hydroperoxide, is applied to those coated fibres, a rapid ambient temperature cure is obtained. In this manner a 10 minute cure could be obtained from a resin mix having a work life (when not in contact with the coated glass) of more than 1 hr. Importantly this rapid cure is effected at the optimum point in the process cycle, namely the fibre coating stage.

The above example exploits a reversible 'gelation' characteristic of metal salts of organic polymers to give easy handling but also ready solvation when required. Other properties more characteristic of large as distinct from small organic molecules are the often highly specific solvation characteristics. For such reasons the activity Of a polymeric catalyst may be highly specific with regard to the polymer medium in which catalysis must occur. However this property may also be exploited in providing an initial delay to the onset of cure.

Figure 3:
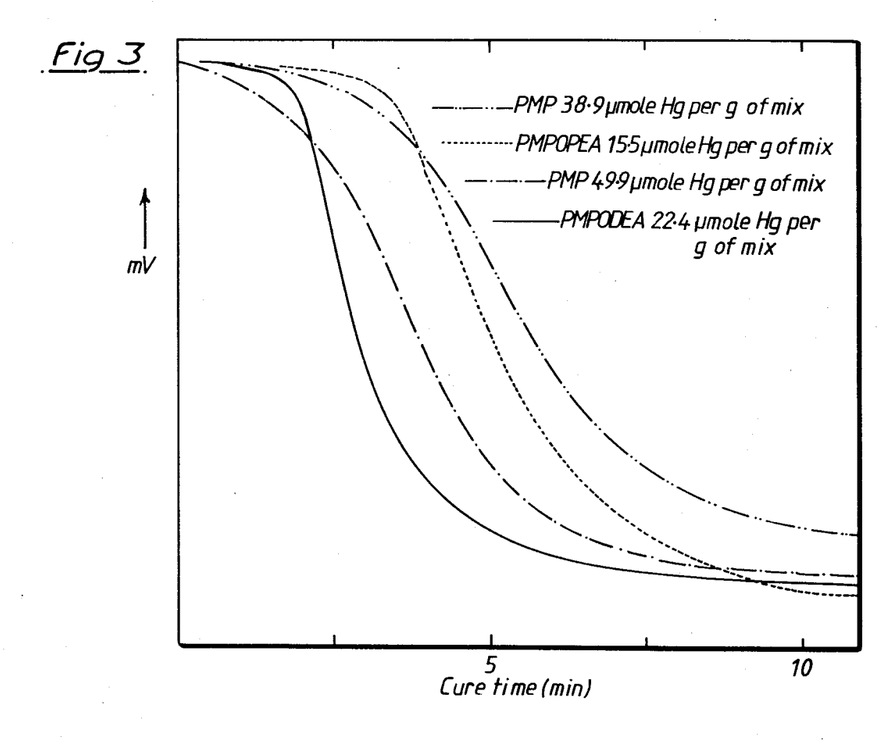
FIG. 3 is a graph showing vibrating needle curemeter traces for cures of poly (oxidiethylene adipate) diol ('Diorez 520') with polymeric MDI ('Desmodur VL'), catalysed with phenylmercury propionate (PMP) or with a polymeric catalyst (PMPODEA—see FIG. 1) in the presence of ethylene gyycol.

Example 10 illustrates how this may be achieved with respect to a polyurethane cure where the catalyst, a polymer-supported organomercury compound of the type described in Example 5 was firstly dispersed in a poorly-solvating medium and then this dispersion added to a curing mix of the type previously described (Example 5). The poorly-solvating medium was ethylene glycol, a co-monomer in the polyurethane curing formulation and the results are shown in FIG. 3 as 'curemeter' traces which reveal a significant initial delay in the case of the polymer-catalysed cure. The delay is significantly better than for a conventional organomercury catalyst (such catalysts themselves being noted for their delayed action character) and is not reproduced when the low-molecular weight catalyst is introduced in ethylene glycol, such addition merely accelerating the cure overall. By a similar approach a curing formulation having had a good storage stability but being capable of thermal activation can be obtained and therefore the processes of this invention are seen to have value in high temperature processes such as RIM.

In the examples described so far it will be seen that a solvent is required for the first stage (catalyst preparation) but the greatest practical benefit is obtained when solvents are excluded from the second stage. That a solvent is required for the first stage may be a little surprising (since this effectively dilutes the reacting groups) yet attempts to carry out some of the above preparations in solvent-free media have confirmed the established findings that such reactions are sluggish. For useful reaction rates the nature of the solvent may not be critical but, for the fastest dissolution of co-reagents, the presence of a hydrogen bonding solvent is usually preferred. This is most clearly illustrated with respect to chromium (III) carboxylates (Example 11). Such a hydrogen-bonding solvent need only be present as a portion of a solvent blend for advantage to be derived. Indeed even trace quantities of the hydrogen-bonding solvent may be beneficial as indicated by the comparative preparations described in Example 12. In this case the product to be prepared was the cobalt (II) carboxylate of a liquid nitrile rubber. When the reagent was cobaltous acetate tetrahydrate, reaction in ethoxyethanol provided instantaneous dissolution of this salt; but even in GPR xylene rapid dissolution could be obtained. However this situation changed markedly when the cobaltous acetate was anhydrous and the xylene was partially dried, when dissolution of the salt was a much slower process. In this comparison the presence of water is recognised as assisting the reaction in xylene.

Indeed water may be employed in the solvent blend to benefit convenience in synthesis. For example one of the ingredients may be present initially in an aqueous solution as described in Example 13. In this case the carboxyl-terminated polymer was dissolved in ethoxyethanol and whilst this solution was distilling, aqueous ferric chloride was run in dropwise (at a sufficiently slow rate to ensure that no cloudiness appeared in the distilling solution of the polymer). This preparation requires the displacement of HCl and evidence for reaction is seen by the strong acidity of the distillate (e.g. pH down to 1-2) and the presence in this distillate of halide ions (white precipitate with silver nitrate solution).

The product obtained after distillation of all the solvent is a dark amber/brown polymer which was capable of effecting a rapid cure with an epoxy resin.

The polymer used in Example 13 is also soluble in acetic acid, a feature which can be used in a convenient synthesis of a metal containing polymer which uses the metal oxide as raw material. For example stannous ions may be incorporated (Example 14) into poly(oxydiethylene adipate) to the benefit, for example, of subsequent epoxy cures. The incorporation of stannous ions into a polymer provides a means for achieving catalysis of a cure without introducing colour to the basic resin mix, a feature which would be of value in surface coatings.

In this latter case the choice of solvent may be seen as critical as stannous ions may not readily remain in solution in water or alcohols under non-acidic conditions.

The presence of metal ions within a polymer facilitates the addition of other components into that polymer: thus curing times can be reduced by the incorporation of more active chemical species into the curing mix. For example epoxide cures of carboxyl-terminated polymers can be accelerated by incorporating low molecular weight di- or polyfunctional carboxylic acids into the curing mix but such approaches are normally limited by the poor solubility of such acids in common polymers. Example 15 shows how chromium can be used to bring phthalic acid and a nitrile rubber into a homogeneous mix. Such a mix, at close to 1:1 total acid : epoxide stoichiometry, gels rapidly indicating that the catalyst is promoting reaction of both acids.

By increasing the range of species which may be co-reacted modifications to both processing and products may be obtained. For example room-temperature curing of a carboxyl-terminated liquid rubber becomes possible extending the range of applicability of such systems. One advantage here is the facility to use such cure mixes as polymeric binders in large structures where temperature cycling is undesirable. The modifications to the cured products accessible by formulation changes include increases in product rigidity and adhesion resulting from the addition of short chain acids. Thus it will be seen that the presence of metal ions significantly increases the versatility of acidic curing reactions to reproduce, in part, that versatility already known for isocyanate curing reactions (e.g. polyurethanes) and yet achieve this without the penalty of the toxic hazards of isocyanates. Thus the processes of this invention may be used to make rigid or flexible products which may be solid or foamed and may be mouldings, castings, adhesives or coatings.

However, comparisons with polyurethanes do not indicate the full extent of the benefits of this invention, even when restricting the comparisons only to curing technologies. For example the reversible agglomeration effects have no parallel in conventional polyurethanes: in the ionic polymers of this invention these can be exploited to coat a substrate with a nominally 'cured' polymer by a low energy route and a freshly prepared coating can be removed at will. Example 16 shows how a wire can be coated with an electrically resistant rubber and such a coating selectively removed with a solvent. In the coating stage it is the removal of the solvent which provides the mechanism for agglomeration, a process which can be regarded as ionic crosslinking.

The solvent removal of such thin films, although conveniently obtained at ambient temperatures if an appropriate solvent is used, is not excessively rapid and offers scope for controlled etching of the film from the substrate. Not only is this applicable to electrical applications it may also be exploited in other applications (e.g. printing, etc.) particularly since products having a variety of property characteristics can be obtained. Such variety is further extended by the possibility of subsequent curing reactions of the initial network: indeed in the case of the product of Example 16, covalent crosslinking may be accomplished on extended standing at ambient temperature by catalysed autoxidation.

It will be appreciated that the combination of liquid polymer curing and ionic polymer technologies offers scope for the production of a wide range of useful products. For example novel blends may be prepared or improvements made to the production and properties of existing blends. For example PVC-NBR blends are already known but the processes of this invention enable such blends to be prepared as surface coatings with a good adhesion to substrates such as steel. Such formulations would be of value for abrasion and environmental resistant coatings for vehicles or marine structures.

However, the presence of an ionic polymer within the curing mix enables novel blends to be conveniently obtained. For example blends having elastic and viscous components can be produced for energy absorption and other requirements. In Examples 17 and 18 a non-solvent for a polymer is incorporated into a cure mix of that polymer, the ionic components assisting dispersion. The product contains a dispersed liquid phase which does not plasticise the polymer. For example if a high temperature lubricating oil (Example 17) is blended into an alkyd curing formulation, a hard coating can be obtained which possess lubricating properties. Such non-solvents are dispersed within the polymer in microdroplet form and if such a product is treated with a solvent for both the polymer and the entrapped liquid then this liquid can be extracted to give a micro-porous product. By curing polymer/liquid blends having different proportions and compatibilities with one-another products may be obtained which after extraction of entrapped liquid yield products having different porosity characteristics.

Blends of dissimilar materials become more readily accessible also if a metal containing polymer can be further derivatised by exploiting the reactivity of di- and polyvalent metal ions. For example pendant fluoroalkyl groups may be conveniently introduced (Example 19) and thus improved blending of fluorinated and non-fluorinated polymers becomes possible.

The exploitation of the wetting characteristics of these ion-containing polymers applies not only to blending but also to adhesion to fillers or other substrates. For example when a chromium-containing polymer is deposited onto a hydroxyl-containing substrate by evaporation from a solution in a hydroxyl-containing solvent then good adhesion to the substrate is obtained. Such coatings may be applied for a variety of purposes, e.g. to modify either physical or chemical properties. One novel application of this invention is the incorporation of "heat-softening" properties to cotton by the application of a thermoplastic coating (Example 20). The coating applied has such a low softening point (44°–48° C.) to allow the coated fabric to be manipulated by hand when soft to offer potential bandaging applications.

In the case of adhesion to fillers this may be illustrated with reference to the ionic polymer described in Example 21. The first product was a calcium carboxylate polymer derived from the reaction of carboxl-terminated liquid 'nitrile rubber' with calcium oxide. Subsequent manipulation firstly exploited the shear dependent viscosity characteristics of networks incorporating labile crosslinks. Thus it was found that the solvent free product could be coated on calcium carbonate (precipitated) simply by mixing under the high shear conditions of an internal mixer: thermal gravimetric analysis of different portions of the product revealed a uniform distribution of coating.

The coated filler was then introduced into rubber mixes in the conventional manner and subsequent vulcanisation of these mixes revealed useful benefits in reinforcement. It might be expected that the most benefits would be obtained when the polymer backbone of the coating is identical to that of the polymer being vulcanised. Indeed this is seen to be the case: with only a 4% coating of the polymeric calcium salt on the filler, the tensile strength of a 27% AN NBR vulcanisate can be increased significantly without loss of extensibility. Perhaps more significantly major increases in tensile modulus (80% or higher) and in tear strength (70%) are achieved. Such gains bring the performance of a low cost fillers to the levels normally associated with high grade white fillers such as silica, and consequently offers scope for both product improvement and cost benefits.

Such benefits are not confined to nitrile rubbers for such is the scope of this invention that a variety of ionic polymer types can be prepared and coated on calcium carbonate. Indeed even with the 'nitrile rubber' coated-filler already described, useful gains in reinforcement can be obtained in a variety of different rubbers (Example 21).

Good wetting is not only exploitable to benefit physical properties, it may also be used to modify chemical character. Thus manganese dioxide coated with only 1% of the sodium salt of polycarboxyl polybutadiene derivative (as used in Example 22) most ineffective in promoting the room temperature cure of a polysulphide, in marked contrast to the activity of the uncoated oxide. As in the case of Example 9 such a barrier coating can be itself reactived further by appropriate solvating reagents or may be removed completely (as in Example 16) by immersion in a solvent.

It will be apparent that this invention can be beneficial to polymer processing, e.g. in terms of cure acceleration or delay, and additionally facilitates blending or coating. But a particularly advantageous feature of this invention is the ability localise curing reactions within a heterophase system. For example the migration of catalysts can be restrained and curing activity retained even after long periods of storage. A more unusual example is the facility to catalyse reactions in two immiscible phases separately and under independent control. Few pairs of polymers are mutually compatible and the retention of catalyst can be illustrated with regard to metal carboxylate polymers when blended with a liquid polysulphide. For example a colourless polymer which is polyfunctional in carboxylic acid (e.g. an acrylic) can be partially converted to its chromium (III) carboxylate and the presence of the metal ion is recognisable by the green colour imparted to the product. When such a product is stirred into an excess of liquid polysulphide the green colour remains recognisably associated with the dispersed minor component and no transfer to the continuous polysulphide phase is evident.

Example 22 describes such an experiment in more detail in which the separated phases are individually cured. In this case the two polymers were a polycarboxyl polybutadiene derivative and a thiol-terminated liquid polysulphide. Firstly the polycarboxyl polymer was partially converted to its chromium (III) carboxylate. An intimate blend of this product and the liquid polysulphide was prepared (in this case the two classes of polymer were present in close to equal amounts), this blend being opaque in the manner of a dispersion as distinct from a solution.

Epoxy resins are capable of reacting with both carboxylic acid and thiol groups, but when such a resin is stirred into this blend and the mix subsequently heated, a marked stiffening of the mix occurs but the cure is confined to the chromium-containing phase. Thus when dichloromethane is added to this product the cured phase swells, but the uncured phase dissolves. Thus an amber solution can be obtained by filtration, this yielding on evaporation a viscous liquid having infra-red spectrum substantially that of the polysulphide. Alternatively the product obtained after the first epoxy cure can be treated with a solution of ammonium dichromate to effect a stoichiometric cure of the polysulphide. This mix, when cured at room temperature or above, gives an opaque brown rubber which swells in, but is not broken down by, dichloromethane.

A procedure as described above can generate heterophase systems or interpenetrating networks from essentially liquid components. Such procedures offer scope for the manufacture of novel products or for energy savings in the manufacture of reinforced polymer products. In practical terms such energy savings may also result in the reduction of machine wear (e.g. in pipes, pumps or RIM equipment) compared with conventional reinforced liquid curing technologies.

But the application of this invention is not limited to aspects of catalysis, control of catalysis and the benefits thereof, or wetting enhancement as in reinforcement activation. Polymeric metal salts of the type described in this invention may also be effective in polymer stabilisation; especially for the stabilisation of poly(vinyl chloride) (PVC) and its blends. With respect to the stabilisation of compounds containing PVC cadmium and lead compounds are particularly effective but are known to pose special toxic risks.

Yet it has already been established that this invention provides ease of handling of toxic metal ion catalysts and this same advantage should apply to toxic metal ion stabilisers. Example 23 shows how this can be achieved with a cadmium derivative, and where the product of the first reaction is a viscous liquid which is subsequently incorporated into a crosslinking formulation (accelerated-sulphur) capable of binding the cadmium-containing polymer into the product network. Thus the intermediate cadmium derivative is non-volatile and non-dusty and the final product should be resistant to the loss of cadmium containing species by processes such as migration or solvent extraction. That cadmium in the derived form described here is an effective stabiliser (for a nitrile rubber-PVC blend) is seen in the example where a comparison is made with a conventional cadmium stabiliser (cadmium stearate). In this case the cadmium when incorporated initially into a liquid copolymer of the nitrile rubber type is as effective as cadmium stearate even when present at a substantially lower concentration than employed with the stearate.

However it should also be recognised that this invention is even wider in scope than hitherto described. It is not limited only to the full sequence of derivisation and use of a polymer, and can be applied to a metal derivative of a polymer however obtained. In the case of some metal carboxylates of polymers, established and convenient synthetic routes are described in the prior art. These involve the reaction of acid-functional polymers with metal alkoxides in homogeneous solution. Although somewhat limited in the range of metal types readily accessible, the method does provide a route to useful catalytic polymers which have not been hitherto recognised as such. Amongst these are the aluminium and titanium carboxylates which are useful catalysts for epoxy cures.

Such alkoxides are known for their facile reactions with acidic species and in the case of tetrabutoxytitanium (IV)—also called 'tetrabutyl titanate'—a stoichiometric mix with carboxyl-terminated polybutadiene gels immediately even at ambient temperature. Example 24 describes the partial derivatisation of this polymer to the titanium carboxylate and the subsequent cure of the solvent free product with a diepoxide. The high catalytic activity is remarkable: a mix containing only 30 μmole Ti (V) per g gelled in only 15 min at 100° C.

Procedures such as these substantially widen the range of effective catalysts conveniently accessible, for example offering a greater choice of epoxy curing formulations which can yield colourless products.

EXAMPLE 1

Chromic acetate (2.4 g, 10 mmoles) was dissolved in glacial acetic acid (10 ml) and this solution subsequently diluted with ethoxyethanol (100 ml) and added dropwise to a stirred and distilling solution of a carboxyl-terminated liquid acrylonitrile butadiene copolymer (B.F. Goodrich, Hycar CTBNX13; 224 g, 0.139eq) in ethoxyethanol (300 ml). The resulting mixture was distilled to low volume adding more ethoxyethanol dropwise if necessary until acid was no longer detected in the distillate.

Such a product solution, when containing around 30% w/w of polymer was amenable for direct use in film forming compositions: a mix containing 0.06 g of a polyfunctional epoxy resin (Araldite MY 720, Ciba Geigy) per 1 g of polymer could be cast onto substrates and cured to a rubbery film in 1 hr. at 100° C. Alternatively the ethoxyethanol could be completely removed by distillation prior to subsequent compounding and curing. Such solvent-free products are compatible with a wide range of commercial epoxy resins both aromatic and aliphatic, and provide the basis for rapid cures to resilient products, e.g., for use in elastomeric binders.

EXAMPLE 2

When the procedure of Example 1 was repeated using chromic acetate (2.28 g, 12.6 mmole) and carboxyl-terminated liquid acrylonitrile butadiene copolymer (274 g, 0.170 eq) and the initial product formed after distillation of solvent subsequently heated at 100° C. under rotary-oil pump vacuum for 2.5 hr a green viscous liquid product (293 g) was obtained.

The equivalent weight of this product, as determined by acid-base titration, was measured to be 2200; a value which corresponds to a 97% displacement of acetate groups.

EXAMPLE 3

A mixture of a carboxyl-terminated liquid acrylonitrile-butadiene copolymer (Hycar CTBNX13, B.F. Goodrich; 784 g, 0.49 eq), chromic acetate (8.25 g, 36 mmole) and iso-propanol (1.5 l) was heated under reflux until a clear solution was obtained. The solvent was distilled off and the dark green residue heated at 100° C. under vacuum until off-gassing ceased.

The product was a viscous liquid which could be mixed with commercial epoxy resin. When mixed with a cycloaliphatic diepoxide of approximate equivalent weight 135 (ERL 4221, Union Carbide) a reaction mix containing a 10% stoichiometric excess of that epoxide could be gelled in 60 minutes at 70° C. Such a mix when subjected to a press cure (70° C./16 hr) gave a rubbery product with the following properties: tensile strength, 2.2 MPa; elongation at break, 810%. When cured under the same conditions but with a 40% excess of the diepoxide a slightly weaker product was obtained, e.g. tensile strength; 1.6 MPa; elongation at break; 610%.

When the carboxyl-terminated liquid acrylonitrile-butadiene copolymer (63.3 g, 39 meq) was mixed with the same cycloaliphatic diepoxide (5.98 g, 44 meq) and chromium octoate (1.58 g, 3.3 mmole) until homogeneous and then press-cured for 16 hr at 70° C. a product with the following properties was obtained: tensile strength, 0.47 MPa; elongation at break, 1,400%.

EXAMPLE 4

When a solution of a thiol-functional poly(bisthioethylene formal) (LP-3, Thiokol liquid polysulphide) (10.0 g, 20.0 meq) in dichloromethane (50 ml) was shaken with a solution of copper (II) acetate monohydrate (1.00 g, 5.0 mmole) in ethanol (100 ml), a rapid colour change from blue to yellow-green occurred. The product mix appeared to be heterogeneous and separated on standing into a colourless acidic (pH3) layer (upper) and a viscous yellow-green solution. This lower coloured layer was shown by infra-red spectroscopy to be substantially the liquid polysulphide but the absorption characteristic of thiol (ca. 2550 cm$^{-1}$) was greatly reduced below that observed in the spectrum of the starting polymer. Although strongly coloured this product layer possessed no i.r. absorptions characteristic of acetate. Evaporation of residual solvent from this product yielded a paste which was not readily redissolved by dichloromethane.

When the preparation was repeated with a larger excess of thiol (LP-3; 102.0 g, 204 meq in 100 ml dichloromethane: copper acetate monohydrate, 1.02 g, 5.1 mmole in 100 ml ethanol), a yellow-green polymer solution precipitated as before. When separated and the residual solvent evaporated off, this product polymer was found (by micro-analysis) to contain 0.34% Cu.

The procedure for catalysing an oxidative cure of thiol-terminated liquid polymer was as follows. The above product was redissolved in dichloromethane (to make a 410 g/litre soln) and a portion (10.0 ml) of this solution was added to a thiol-functional poly(bisthioethylene formal) (LP-2, Thiokol liquid polysulphide) (86.5 g), containing also a trace of nitrile rubber (Krynac 34.50, Polysar; 2.5 mg in 0.6% w/w soln in dichloromethane) and the solvent present was evaporated off to leave a green viscous masterbatch of polymer and catalyst. To a portion (2.2 g) of this mix was then added a solution of diaminobicyclooctane (DABCO, Air Products) (0.155 g) in dimethylformamide (1.10 g), an the product mix was cast as a thin film which subsequently cured (tack-free), in air on standing for 5-6 hours.

EXAMPLE 5

A mixture of succinic anhydride (14.5 g, 145 mmole) and poly(oxydiethylene adipate) polyol (Briggs and Townsend, Diorez PR1; 312 g, 435 meq, mean functionality 2.8) was heated for 24 hr at 120° C., after which time the mixture possessed no infra-red absorptions characteristic of anhydride (i.e. disappearance of peaks at ca. 1800 and 1860 cm$^{-1}$). The conversion of the anhydride to the 'half ester' (i.e. to the —O$_2$CC$_2$H$_4$CO$_2$H grouping) was indicated by the appearance of a broad absorption, characteristic of acidic hydroxyl, in the infra-red spectrum of the product at around 3240 cm$^{-1}$.

A portion of this acid-containing polymer (29.0 g) was then heated with phenylmercury acetate (6.52 g, 19.3 mmole) in refluxing 1-methoxypropan-2-ol for 2.5 hr in a nitrogen atmosphere. Subsequent distillation to low volume gave an acid (pH4) distillate and a residue which, after repeated reprecipitation from acetone/water mixtures and evaporation of remaining solvent (under rotary-oil pump vacuum at 100° C.), was shown to contain mercury (9.3%) by elemental analysis. The infra-red spectrum of this product showed no absorption characteristic of acidic hydroxyl but showed two absorptions characteristic of carboxylate at ca. 1560 and 1640 cm$^{-1}$).

When a portion of this product (0.41 g) was added to a poly(oxydiethylene adipate) diol (Briggs and Townsend, Diorez 520; 10.9 g, 10.9 meq) and the resulting blend mixed with polymeric MDI (Bayer AG, Desmodur VL; 1.62 g, 11.6 meq) a rapid room temperature cure was achieved. This cure, monitored by a simple research curemeter (see FIG. 1) was substantially more rapid than for an equivalent cure but catalysed by phenylmercury propionate at a loading of 16.1 μmole Hg per g of mix. These two cures, and that of a cure catalysed by phenylmercury propionate at a loading of 48.4 μmole Hg per g of mix, are compared in FIG. 1.

EXAMPLE 6

Poly(propylene oxide) polyol (Lankro, Propylan B382; 910 g, 778 meq, mean functionality 3) was reacted with succinic anhydride (25.9 g, 259 mmole) in the manner of the previous example. A portion of the acid-containing product (193 g) was then heated with phenylmercury hydroxide (23.7 g, 80.3 mmole) in a boiling mixture of isopropanol (150 ml) and dichloromethane (150 ml). The reaction flask was purged with nitrogen and was equipped with a reflux condenser and a Soxhlet thimble containing type 4A molecular sieve for extraction of water from the vapour phase. After heating under reflux for 2.5 hr the mixture was cooled and filtered and the filtrate reduced to low volume by distillation under nitrogen at atmospheric pressure; any further precipitate being also subsequently removed by filtration. The final traces of solvent and water were then removed by distillation under rotary-oil pump vacuum to yield a clear viscous liquid residue which had an infra-red spectrum showing characteristic carboxylate absorptions (ca. 1580 and 1660 cm$^{-1}$) Infra-red spectroscopy also recorded a corresponding reduction in carboxylic acid during the progress of this reaction.

When a portion of this polymeric product (1.04 g) was blended with poly(propylene oxide) diol (Lankro, Propylan D2122; 10.1 g, 10.1 meq) and polymeric MDI (Bayer AG, Desmodur VL; 1.04 g, 11.9 meq) a rapid room temperature cure was obtained. This cure, monitored by a simple research curemeter (see FIG. 2) was substantially more rapid than for an equivalent cure but catalysed by phenylmercury propionate at a loading of 13.8 μmole Hg per g of mix. These two cures, and that of a cure catalysed by phenylmercury propionate at a loading of 34.8 μmole Hg per g of mix, are compared in FIG. 2.

However the above polymeric catalyst was not as effective at promoting an isocyanate cure of a hydroxyl-terminated polybutadiene (ARCO R45HT) as was a polybutadiene-supported organomercury catalyst (e.g. obtained by complete conversion of acid in Thiokol carboxyl-terminated polybutadiene using phenylmercury acetate). The respective values of hardness after 5 hours of simultaneous room temperature cures (with polymeric MDI, isocyanate index 1.1) were 33 Shore A (for PBD/Hg catalysed at 3.9 μmole Hg per g of mix) and 24 Shore A (for PPO/Hg catalysed at 4.0 μmole Hg per g of mix).

EXAMPLE 7

A mixture of mercuric acetate (4.69 g, 14.7 mmole), hydroxyl-terminated polybutadiene (ARCO, R45HT, 19.9 g) isopropanol (25 ml) and dichloromethane (25 ml) was heated under reflux for 17 hr. After removal of the solvent on a rotary evaporator a clear yellow viscous liquid remained, this liquid having an infra-red spectrum which shows absorptions at ca. 430 cm$^{-1}$ (characteristic of organo-mercury) in and at ca. 1720 cm$^{-1}$ (characteristic of ester carboxyl) which are not present in the respective spectra of the reagents. An absorption band at ca. 1600 cm$^{-1}$ (characteristic of carboxylate) present in the infra-red spectrum of mercuric acetate is also present in the spectrum of this reaction product.

When a portion of this product (1.34 g) was blended with hydroxyl-terminated polybutadiene (ARCO, R45HT; 9.70 g 8.02 meq) and polymeric MDI (Bayer AG, Desmodur VL; 1.34 g, 9.6 meq), to give a mix containing 11.1 μmole Hg per g, a rapid room temperature cure (gel time, approx 3.5 min) was obtained.

EXAMPLE 8

Phthalic anhydride (206 g, 1.39 mole) was melted in a 1 litre reaction vessel and oleic acid (200 g, 0.708 mole) was then added, the mixture being stirred at 135°-140° C. until a solution was obtained. To this solution was then added glycerol (92.0 g, 1.00 mole) and diethylene glycol, 'digol', (21.2 g, 0.200 mole) and the reaction temperature subsequently increased at about 1° C./min until a temperature of 240° C. was attained. This final temperature was maintained for a further 10-15 min before cooling the melt to give a brown glossy product at ambient temperature. The strongest peak in the infra-red spectrum of the product was that at ca. 1740 cm$^{-1}$ (characteristic of carboxyl) whilst absorptions at ca. 3500 cm$^{-1}$ (characteristic of alcoholic hydroxyl) and at 1800 and 1860 cm$^{-1}$ (indicating trace residues of anhydride) were also present.

A portion of this product (96.9 g) was then subsequently reacted (120° C./30 hr) with succinic anhydride (6.4 g, 64 mmole) in the manner of Example 5. The resulting acid-functionalised product was found to have an equivalent weight (by acid-base titration) of 630±10.

A portion of this latter product (19.8 g, 31.5 meq) was then heated with cobalt acetate tetrahydrate (0.42 g, 1.7 mmole) in xylene (50 ml) and 2-ethoxyethanol (50 ml), in an atmosphere of nitrogen. The reaction was conducted under reflux for the brief period required for dissolution of the acetate and then the mix was distilled; further additions of 50:50 xylene:ethoxyethanol being added until a nearly netural (pH6) distillate as obtained. This final product, after removal of solvent, had a measured equivalant weight of 690±20 (expected, 708 for 100% conversion of acetate).

When a film of this final product was cast from 2-ethoxyethanol a hard cure could be obtained after heating in an air oven for 16 hr at 100° C. A corresponding film cast in the same manner from the precursor product (i.e. acid-functionalised but not containing cobalt) gave only a soft and tacky cure under equivalent conditions.

EXAMPLE 9

Maleic anhydride (216 g, 2.20 moles) was added to diethylene glycol, 'digol', (212 g, 2.00 moles) at 80° C. in a flask equipped with a thermometer (to register the temperature of the mix) stirrer and a nitrogen inlet tune. A slow nitrogen purge was maintained whilst the temperature of the mix was slowly increased, the external supply of heat being removed if an excessive exotherm was detected. In this manner the temperature of the mix was increased to 190° C. over a period of 5 hr and maintained at this temperature for a further 2 hr, under an atmospheric pressure of nitrogen, and for a further 1 hr under a light vacuum (10–20 cm Hg). The product was cooled under nitrogen to give solid polyester having an infra-red spectrum characterised by a strong absorption at ca. 1740 cm$^{-1}$ (characteristic of carboxyl) and a broad absorption between 3000 and 2500 cm$^{-1}$ (characteristic of carboxylic acid OH).

A portion of this acid-functionalised poly(oxydiethylene maleate) (9.5 g) was subsequently heated with anhydrous cobaltous acetate (0.42 g, 2.4 mmole) in refluxing 2-ethoxyethanol, under nitrogen, until dissolution occurred. The solvent and volatile by-products were then removed by distillation, firstly under nitrogen and subsequently under vacuum, at 120° C., to give a resilient solid product. Although dimensionally stable this product was completely soluble in dichloromethane and could be applied (as films) to substrates by evaporation from such a solution. A coating on glass fibres (chopped-strand mat) showed a uniform distribution of colour and was tack free at a 20% w/w loading on the glass. When a further sample of the original poly(oxydiethylene maleate) (100 parts) was mixed with styrene (43 parts) and methyl ethyl ketone peroxide (2.4 parts) and coated on this treated glass (120 parts), this composite mix cured to hard product after only 10 minutes standing at room temperature.

EXAMPLE 10

When the mercury-containing (9.3% Hg w/w) polyester product of Example 5 (2.38 g) was blended with ethylene glycol (1.19 g) a turbid mix was obtained. A small portion of this mix (0.76 g) was an effective catalyst for a cure of poly(oxydiethylene adipate) diol (Briggs and Townsend, Diorez 520; 12.7 g, 12.7 meq) with polymeric MDI (Bayer AG, Desmodur VL; 2.65 g, 18.9 meq) but this cure having a marked delay (ca. 2 min) before the apparent onset of reaction) compared with the polymer-catalysed ethylene glycol-free cure described in Example 5.

Phenylmercury propionate is itself recognised as a catalyst capable of impacting a useful delay into a polyurethane cure and in FIG. 3 four cures are compared to show the benefit obtained from introducing the polymer-supported catalyst in this turbid form. For these examples the catalyst suspension was obtained by mixing the mercury-containing (9.3% Hg w/w) polyeter product-of Example 5 (2.33 g) with ethylene glycol (1.1lg). In one formulation 0.68 g of this blend was mixed with Diorez 520 (12.8 g, 12.8 meq) and tolylene diisocyanate (1.62 g, 18.7 meq): in the other formulation of FIG. 3 0.98 g of this blend was mixed with Diorez 520 (12.2 g, 12.2 meq) and tolylene diisocyanate (1.95 g, 22.4 meq). The cures catalysed with phenylmercury propionate were Diorez 520/TDI formulations having the same ratio of OH:NCO as in the above cures. The marked improvement in delay, obtained with the polymer-supported catalyst, is apparent from the 'curemeter' traces obtained. Not only can the polymer-supported catalyst offer greater controllability in this way, but also effective curing is obtained (as with Example 5) with significantly lower concentrations of mercury than are required with the low molecular weight catalyst.

EXAMPLE 11

Solutions of carboxyl-terminated liquid acrylonitrile-butadiene copolymer (B.F. Goodrich, Hycar CTBNX13) were heated under reflux, over chromic acetate, for 16 hours. The results of comparative experiments are summaried in Table 1.

TABLE 1

| | Reactions with Chromic Acetate | | |
|---|---|---|---|
| | I | II | III |
| CTBNX13 | 19.5 g | 18.7 g | 18.2 g |
| | 12.1 meq | 11.6 meq | 11.3 meq |
| chromic acetate | 0.21 g | 0.20 g | 0.19 g |
| | 0.92 mmole | 0.87 mmole | 0.83 mmole |
| solvent | butyl acetate | toluene | isopropanol |
| | 50 ml | 50 ml | 50 ml |
| Comment | No perceptible dissolution of acetate after 16 hrs' reflux | | Dissolution of acetate commences almost immediately and is complete within 16 hrs. |

EXAMPLE 12

Solutions of carboxyl-terminated liquid acrylonitrile-butadiene copolymer (B.F. Goodrich, Hycar CTBNXI3) were heated under reflux over cobaltous acetate (either anhydrous or tetrahydrate) in an atmosphere of nitrogen until dissolution occurred. The results of comparative experiments are summarised in Table 2.

TABLE 2

| | Reactions with Cobaltous Acetate | | |
|---|---|---|---|
| | I | II | III |
| CTBNX13 | 10.1 g | 11.6 g | 10.1 g |
| Cobaltous acetate (anhydrous) | — | — | 0.55 g 3.1 mmole |
| Cobaltous acetate tetrahydrate | 0.78 g 3.1 mmole | 0.90 g 3.6 mmole | — |
| Solvent | xylene (GPR) 100 ml | 2-ethoxyethanol 100 ml | xylene (partially dried)* 100 ml |
| Comment | Dissolution of acetate complete after 5 min | Immediate dissolution of acetate | Dissolution of acetate complete after 30 min |

*Partially dried by taking 200 ml of GPR solvent and distilling to half bulk though a fractionating column under an atmosphere of dry nitrogen.

In all cases once the process of dissolution was complete, no si9nificant differences were noted between the relative rates of subsequent reaction: all three mixes 9ave an acid distillate as distillation was commenced after solvation was complete.

EXAMPLE 13

A solution of a carboxyl-terminated liquid poly(oxydiethylene adipate) (Diamond Shamrock, DP 2081/84; 40.2 g, 45 meq) in ethoxyethanol (70 ml) was distilled slowly whilst an aqueous solution (~5-10 ml) of ferric chloride hexahydrate (0.95 g, 3.5 mmole) was run in over a period of 60 min. Whilst distillation slowly continued a further 50 ml of distilled water was run dropwise into the polymer solution to encourage displacement of HCl. Finally the reaction mix was heated under vacuum at 120°-150° C. until off-gassing ceased.

The product, when blended with a suitable polyfunctional epoxide (MY 720, 1.75 g per 10 g of polymer product) cured to a soft rubber in 15 min at 150° C.

EXAMPLE 14

A mixture of a carboxyl-terminated liquid poly(oxydiethylene adipate) (Diamond Shamrock, DP 2081/84; 22.7 g, 25 meq), stannous oxide (0.28 g, 2.1 mmole) and acetic acid (25 ml) was heated in a nitrogen atmosphere and under reflux until a clear solution was obtained. The solvent was distilled off at atmospheric pressure and the residue finally heated at 120° C. under vacuum for 90 min.

The product was a pale amber liquid which possessed no smell of acetic acid. When blended with a suitable polyfunctional epoxide (Ciba Geigy, Araldite MY 720; 2.1 g per 10 g of polymer product) the product cured to a transparent resilient elastomer in 30 min at 120° C.

EXAMPLE 15

A mixture of a carboxyl-terminated liquid acrylonitrile-butadiene copolymer (B.F. Goodrich, Hycar CTBNX13; 14.5 g, 9 meq), phthalic acid (1.49 g, 18 meq), chromic acetate (0.69 g, 3 mmole) and n-butanol (70 ml) were heated together under reflux until a clear solution was obtained.

The solvent was distilled off and the dark green residue heated at 120° C. under vacuum until off-gassing ceased.

When a little of this product (2.8 g) was mixed with a cycloaliphatic diepoxide of approximate equivalent weight 135, (ERL 4221, 0.64 g) a highly active curing mix was obtained. Such a mix gelled in only 7 min at 70° C., and cured at room temperature when left to stand overnight.

EXAMPLE 16

A carboxyl-terminated polybutadiene (Thiokol, HC 434; 52.5, 32 meq) was dissolved in ethoxyethanol (150 ml). To this solution was added anhydrous cobaltous acetate (1.42 g, 8.0 mmole) and the mixture was heated under reflux, and under nitrogen, until all the cobaltous acetate dissolved. The solvent was then distilled off (under nitrogen) and the residue finally heated under vacuum at 120° C. until all off-gassing ceased. The produce was a dark reddish-brown rubbery polymer which dissolved on standing in the cold, or more rapidly on heating, in solvents for the original polymer. For example the product was completely soluble in dichloromethane, giving a dark red solution.

When a piece of tinned copper wire was dipped into this solution and removed to dry in air a coherent coating on the wire was formed. Such a coating when only 0.1-0.15 mm thick provided electrical resistance. Yet conductivity to the wire was restored after this coated wire had been immersed in cold toluene for 5 minutes, the wire now showing no visual traces of the previous coating. When a similar coating was deposited on a sheet of tinned-steel and a solvent (e.g. toluene) added in discrete droplets, then, provided elevated temperatures or excessively long exposures were not employed, the rubber coating was removed from the metal only in those regions covered by the solvent.

EXAMPLE 17

Chromic acetate (1.00 g, 4.4mmole) was dissolved in glacial acetic acid (4 ml) and this solution subsequently diluted with ethoxyethanol (50 ml) and added dropwise to a stirred and distilling solution of a carboxylic acid functional terephthalate alkyd resin (Cray Valley Products, E5090; 50.3 g, 56.5 meq) in ethoxyethanol (200 ml). The resulting mixture was distilled to low volume and subsequently heated at 140° C. under vacuum until off-gassing ceased.

The product was a transparent green thermoplastic. At temperatures of around 100° C. this product was soft and could be directly blended into a curing formulation. One such formulation containing the product (1.0 parts), oleic acid (0.055 parts), lubricating oil (sentinel superheat steam oil, 0.30 parts) and epoxy resin (MY 720; 0.15 parts) could be cured at 100° C. on steel plate to give a surface coating possessing a greasy feel, and suitable for 'dry' lubrication applications.

EXAMPLE 18

A mixture of a carboxyl-terminated poly(tetramethylene adipate) (Diamond Shamrock, DP 2081/85; 50.3 g, 49.3 meq), chromic acetate (0.52 g, 2.3 mmole) and isopropanol (100 ml) was heated under reflux until all the chromic acetate had dissolved. The solvent was then distilled off and the dark green residue heated at 120° C. under vacuum until acetic acid could not be detected (smell) in the residue. This product crystallised on cooling to give a light green waxy solid (m.p. 44°-48° C.).

A portion of this product (25.5 g) was blended with ethylene glycol (5.1 g) and with a polyfunctional epoxy resin (MY 720; 2.6 g) and cured in a press for 1 hr at 70° C. to give a sheet 0.9 mm thick. When this sheet was left to stand in cold water for 3 hr and subsequently dried under vacuum a product having a porous surface was obtained. However, when left to stand in a solvent which swells the polymer (e.g. cold tetrahydrofuran) for a similar period of time and subsequently freeze dried under vacuum the porosity could be extended throughout the bulk of the product.

EXAMPLE 19

When a portion (1.11 g) of the initial chromium-containing product of the type described in Example 17 was blended with perfluorooctanoic acid (0.07 g, 0.4 mmole) and a polyfunctional epoxy resin (Ciba Geigy, Araldite MY 720; 0.15 g, 1.2 meq) in dichloromethane a clear solution was obtained into which powdered PTFE (0.6 g) could be dispersed.

A visually uniform 'milky green' film was obtained when the solvent was allowed to evaporate off this blend. Such a film, on unprimed steel, could be cured at 150° C. for 20 minutes to give a hard coating with reasonable adhesion to the steel. A coherent film with smooth low friction surface was obtained. Scanning electron microscopy showed good wetting between the resin and dispersed PTFE.

EXAMPLE 20

When a portion of the initial chromium-containing product of the type described in Example 18 was mixed with a cycloaliphatic diepoxide (ERL 4221, 0.32 g per 1g polymeric product) and dissolved in a blend of butyl acetate and isopropanol (4:1 v/v) a free flowing solution was obtained which could be spread and cured (90° C./30 min) on suitable substrates. When treated in this way an open weave cotton fabric adopted essentially thermoplastic character, having its conventional flexibility above the polyester melting point but showing marked stiffness at ambient temperatures.

EXAMPLE 21

A mixture of calcium oxide (4.32 g, 77.2 mmole) and carboxyl-terminated liquid acrylonitrile-butadiene copolymer (B.F. Goodrich, Hycar CTBNX13; 248 g, 153 meq) was heated for 10 min in a refluxing mixture of 2-ethoxyethanol (300 ml) and n-butanol (100 ml). the solvents and volatile byproducts were then removed, firstly by distillation at atmospheric pressure and subsequently by heating at 110°-130° C. under rotary-oil pump vacuum. A clear amber solid rubber was obtained and a portion of this (95 g) was blended at 160° C. with precipitated calcium carbonate (Calofort U; 1.82 kg) in a (preheated) internal mixer over a period of 1 hr. The product obtained was an off-white, free-flowing powder shown by thermogravimetric analysis to have an average organic content of 4.2% by weight. The product was visually uniform and analyses of samples selected from various portions of the powder revealed a substantially similar proportions of organic material (maximum found 4.5%, minimum found 4.0%).

This coated product was incorporated into a range of different curing formulations (Table 3), each mix being subsequently vulcanised into sheets suitable for mechanical testing. The mechanical properties obtained are summarised in Tables 4 and 5. Significant improvements in properties, notably in modulus and tear strength, can be obtained when using this polymer-coated filler in place of a conventional calcium carbonate; these improvements being most marked when the vulcanised rubber was a copolymer of the same type and approximate composition as that coated on the filler (e.g. see Table 4).

TABLE 3

Formulations and Cures employing Polymer-coated and Conventional White Filler (Calcium carbonate)

|  |  |  |  |  |  |
|---|---|---|---|---|---|
| Krynac 27.50 | 100 | — | — | — | — |
| Krynac 806 | — | 100 | — | — | — |
| Intol 1500 | — | — | 100 | — | — |
| Nordel 440 | — | — | — | 100 | 100 |
| Sulphur MC | 1.75 | 1.75 | — | — | — |
| Sulphur | — | — | 2.50 | 2.00 | 0.30 |
| Zinc oxide | 5.00 | 5.00 | 5.00 | 5.00 | 5.00 |
| Stearic acid | 1.50 | 1.50 | 1.50 | 0.50 | — |
| Flectol H | 1.00 | 1.00 | 1.00 | — | — |
| White filler | 100 | 100 | 100 | 100 | 100 |
| TMTD | 0.25 | 0.25 | 0.50 | — | — |
| MBTS | 1.50 | 1.50 | 2.00 | 1.00 | — |
| TMTM | — | — | — | 1.00 | — |
| ZDBC | — | — | — | 2.00 | — |
| Perkadox 14/40 | — | — | — | — | 7.00 |
| Cure temp (°C.) | 150 | 160 | 160 | 160 | 170 |
| Cure time (min)* | 8/7 | 18/22 | 10/15 | 9/18 | 40/40 |

*The first time is for polymer-coated filler, the second time is for a conventional white filler (Winnofil S).

TABLE 4

Mechanical Properties of Accelerated-Sulphur Cured NBR (27% AN)

|  | Filler Type | |
|---|---|---|
|  | Polymer-coated CaCO$_3$ | Winnofil S |
| T.S. (MPa) | 5.39 | 3.90 |
| E.B. (%) | 520 | 480 |
| 100% Modulus (MPa) | 2.16 | 1.21 |
| 300% Modulus (MPa) | 3.84 | 1.95 |
| Hardness (Shore A) | 67 | 64 |
| Delft Tear Strength (N) | 29.2 | 17.6 |

TABLE 5

Mechanical Properties of Cured Rubbers

| Polymer | Cure Type | Filler | Modulus (MPa) 100% | 300% | Delft Tear Strength (N) |
|---|---|---|---|---|---|
| NBR (50% AN) | Accelerated-sulphur | Polym-coated | 3.54 | 5.60 | 39.8 |
|  |  | Winnofil S | 2.04 | 3.40 | 30.2 |
| SBR | Accelerated-sulphur | Polym-coated | 2.36 | 4.00 | 28.4 |
|  |  | Winnofil S | 0.98 | 1.55 | 22.3 |
| EPDM | Accelerated-sulphur | Polym-coated | 2.52 | 4.96 | 31.0 |
|  |  | Winnofil S | 2.01 | 3.54 | 19.1 |
| EPDM | Peroxide | Polym-coated | 3.76 | — | 25.8 |
|  |  | Winnofil S | 1.81 | 2.91 | 17.8 |

EXAMPLE 22

A carboxylic acid-functional polymer was prepared by heating a maleinised polybutadiene (Revertex, Lithene PM25MA; 50.7 g) with methanol (5.07 g) under reflux conditions until a clear viscous product was obtained. The infra-red spectrum of this product was characterised by a broad peak at ca. 3000 cm$^{-1}$ (assigned to acid OH) and peaks at ca. 1710 and 1740 cm$^{-1}$ (assigned to acid or ester carboxyls) which were not present in the spectra of the original reagents. To this reaction product was then added 1-methoxypropan-2-ol (100 ml) and chromic acetate (0.66 g, 2.9 mmole), and the mixture was heated under reflux for 1 hr when a clear dark green solution was obtained. The mixture was then distilled to remove acidic byproducts (pH 4 distillate) and a further 100 ml of 1-methoxypropan-2-ol was added during this distillation. After reducing the mix to low volume and subsequently cooling, diethyl ether (100 ml) was added with stirring.

The product polymer was precipitated from this solution by adding excess (200 ml) methanol, and the separated polymer layer was added directly to a solution of a thiol-functional poly(bisthioethylene formal) (Thiokol LP-32; 50.8 g, 25.4 meq) in dichloromethane (50 ml). After thorough blending the solvents were evaporated off to leave a cloudy green viscous liquid (83.7 g).

When a portion of this product (22.7 g) was mixed with an epoxy resin (Union Carbide, ERL 4221; 2.32 g, 17.2 meq) and heated at 70° C. for 3 hr, a stiff pasty material was obtained. This latter product when digested in dichloromethane (200 ml) separated into two layers, a swollen green gel (upper) and an amber solution (lower). The lower layer when separated and evaporated free of solvent produced an amber viscous liquid with an appearance and infra-red spectrum substantially that of the original thiol-terminated liquid polymer.

When a second portion of the cloudy green product described above (22.6 g) was cured at 70° C. for 3 hr with the same epoxy resin (2.31 g, 17.1 meq) and the pasty material obtained subjected to a second cure (by adding 0.29 g ammonium dichromate in 1.5 g DMF and heating for a further 30 min at 70° C.) a brown rubbery product was obtained (hardness, 22 Shore A). This product swelled in dichloromethane but did not break down further.

EXAMPLE 23

A solution of a carboxyl-terminated liquid acrylonitrile-butadiene copolymer (B.F. Goodrich, Hycar CTBN 1300X13; 262 g, 163 meq) in ethoxyethanol (300 ml) was slowly distilled under nitrogen, whilst a methanolic solution (50 ml) of cadmium acetate dihydrate (3.63 g, 13.6 mmole) was slowly added. A dark brown viscous product was obtained which was subsequently heated under vacuum until off-gassing ceased. The product (262 g) was characterised by an infra-red absorption at ca. 1580 cm$^{-1}$ attributed to the presence of carboxylate.

A portion of this product was incorporated into a nitrile rubber-PVC blend for evaluation as a stabiliser, the formulation and cure, and that of a reference formulation containing cadmium acetate, are listed in Table 6.

TABLE 6
Formulation and Cure for a NBR PVC Blend

|  | A | B |
| --- | --- | --- |
| Breon Polyblend 505 | 100 | 100 |
| FEF Black | 70 | 70 |
| Cadmium-containing product as above | 10 | — |
| Dioctyl phthalate | — | 10 |
| Cadmium stearate | — | 1.5 |
| Zinc oxide | 5.0 | 5.0 |
| Stearic acid | 1.0 | 1.0 |
| TMTD | 0.2 | 0.2 |
| MBTS | 1.5 | 1.5 |
| Sulphur MC | 1.5 | 1.5 |
| Octamine | 1.0 | 1.0 |
| Cure temp (°C.) | 150 | 150 |
| Cure time (min) | 10 | 10 |
| Estimated Cd content (μmole/g of mix) | 2.7 | 12 |

The two formulations were both cured as sheets of 3 mm thickness. When standard test pieces were subjected to air-oven ageing at 70° C. for 1 week, the retention of tensile strength was 94–95% in both cases despite the substantially lower content of cadmium in the case of Mix A.

EXAMPLE 24

A solution of carboxyl-terminated polybutadiene (Thiokol, HC434; 53.2 g, 32.5 meq) in dichloromethane (100 ml) was shaken vigorously whilst a solution of tetrabutoxytitanium (0.61 g, 1.8 mmole) in methanol (50 ml) was slowly added. When left to stand the mixture formed two layers. The lower layer, an amber viscous solution, was separated and heated at 100° C. under rotary-oil pump vacuum to produce a brown viscous liquid similar in colour and appearance to the original polymer. However in the infra-red spectrum was a weak absorption at ca. 1560 cm$^{-1}$ not present in the spectrum of HC434 (and more intense when the above experiment was repeated using higher proportions of tetrabutoxytitanium; this absorption being assigned to a titanium carboxylate grouping).

When a portion of the above product (3.80 g) was mixed with an epoxy resin (Union Carbide ERL 4221; 0.30 g) a mix was obtained which gelled after only 15 minutes heating at 100° C.

I claim:

1. A process for the production of a non-aqueous polymer product which comprises (1) reacting a lower molecular weight polymer having reactive terminal carboxyl or thiol groups and a number average molecular weight of less than 20,000, measured in terms of polystyrene equivalents, in solution in a solvent for said polymer, with a metal salt in a ratio of metal ions in said metal salt to carboxyl or thiol groups in said lower molecular weight polymer of not more than about 1.5:1, respectively, to form a mobile or thermoplastic metal containing polymer, and (2) incorporating said metal-containing polymer into a higher molecular weight polymer.

2. A process as recited in claim 1 in which said metal salt is a salt of a dipositive metal and the ratio of metal ions in said metal salt to carboxyl or thiol groups in said lower molecular weight polymer is not more than about 0.5:1, respectively.

3. A process as recited in claim 1 in which said metal salt is a salt of a tripositive metal and the ratio of metal ions in said metal salt to carboxyl to thiol groups in said lower molecular weight polymer is not more than about 0.1:1, respectively.

4. A process as recited in any one of claims 1–3, inclusive, in which said higher molecular weight polymer is formed from the same monomer or monomers as those used to form said lower molecular weight polymer.

5. A process as recited in claim 4 in which said higher molecular weight polymer is part of a curing formulation and the metal ions in said metal-containing polymer initiate or catalyze the cure of said higher molecular weight polymer.

6. A process as recited in claim 5 carried out in the presence of an additional component which does not participate in the cure of said higher molecular weight polymer.

7. A process as recited in any one of claims 1–3, inclusive, in which said higher molecular weight polymer is formed from a monomer or monomers different from those used to form said lower molecular weight polymer.

8. A process as recited in claim 7 in which said higher molecular weight polymer is part of a curing formulation and the metal ions in said metal-containing polymer initiate or catalyze the cure of said higher molecular weight polymer.

9. A process as recited in claim 8 carried out in the presence of an additional component which does not participate in the cure of said higher molecular weight polymer.

10. A process as recited in claim 8 or 9 in which said metal-containing polymer is coated on a substrate and said higher molecular weight polymer is contacted with said coated substrate prior to or during the cure of said higher molecular weight polymer.

11. A process as recited in claim 10 in which said substrate is a reinforcing agent.

12. A process as recited in claim 10 or 11 in which said metal-containing polymer is a stabilizer for said higher molecular weight polymer.

13. A process as recited in claim 1 in which only a portion of the carboxyl or thiol groups in said lower molecular weight polymer react with said metal salt and the unreacted carboxyl or thiol groups remain available to initiate or catalyze the cure of said higher molecular weight polymer.

14. A process as recited in claim 1 in which said metal-containing polymer is formed in the presence of an excess of said lower molecular weight polymer, and said excess of said lower molecular weight polymer is subsequently cured in the presence of said higher molecular weight polymer, with the metal ions in said metal-containing polymer serving to initiate or catalyze said cure.

15. A process as recited in claim 1 in which said metal salt is an acetate, carbonate, chloride, hydroxide, oxalate, oxide or sulfate of aluminum, barium, calcium, cesium, cadmium, cobalt, chromium, copper, iron, mercury, potassium, lithium, magnesium, manganese, molybdenum, sodium, lead, tin, titanium, vanadium, zinc or zirconium.

16. A process as recited in claim 1 in which said lower molecular weight polymer is a liquid, carboxyl-terminated acrylonitrile/butadiene copolymer.

17. A process as recited in claim 1 in which said lower molecular weight polymer is a liquid, thiol-terminated poly(bisthioethylene formal).

18. A process as recited in claim 1 in which said lower molecular weight polymer is a carboxyl-terminated alkyd resin.

19. A process as recited in claim 1 in which said lower molecular weight polymer is a carboxyl-terminated polybutadiene.

20. A process as recited in any one of claims 16–19, inclusive, in which said higher molecular weight polymer is a polyfunctional epoxy resin.

* * * * *